United States Patent
Savo et al.

(10) Patent No.: US 8,307,069 B2
(45) Date of Patent: Nov. 6, 2012

(54) SIMPLIFIED SUPPORT OF AN ISOLATED COMPUTER NETWORK

(75) Inventors: Isak Savo, Västerås (SE); Juan Jaliff, Västerås (SE); Martin Olausson, Västerås (SA); Johan Skarström, Eskilstuna (SE); Fredrik Alfredsson, Västerås (SE)

(73) Assignee: ABB Research Ltd., Zürich (CH)

( * ) Notice: Subject to any disclaimer, the term of this patent is extended or adjusted under 35 U.S.C. 154(b) by 82 days.

(21) Appl. No.: 12/600,342

(22) PCT Filed: Apr. 4, 2008

(86) PCT No.: PCT/EP2008/054113
§ 371 (c)(1),
(2), (4) Date: May 11, 2010

(87) PCT Pub. No.: WO2008/138685
PCT Pub. Date: Nov. 20, 2008

(65) Prior Publication Data
US 2010/0217859 A1    Aug. 26, 2010

(30) Foreign Application Priority Data
May 14, 2007   (EP) .................................. 07108142

(51) Int. Cl.
*G06F 15/16*   (2006.01)

(52) U.S. Cl. .......................... 709/224; 702/186; 714/25

(58) Field of Classification Search .................. 709/224; 702/186; 714/25
See application file for complete search history.

(56) References Cited

U.S. PATENT DOCUMENTS

| | | | | |
|---|---|---|---|---|
| 6,023,507 A | * | 2/2000 | Wookey | 709/224 |
| 6,434,615 B1 | * | 8/2002 | Dinh et al. | 709/224 |
| 6,675,209 B1 | * | 1/2004 | Britt | 709/224 |
| 6,697,969 B1 | * | 2/2004 | Merriam | 714/46 |
| 6,892,236 B1 | * | 5/2005 | Conrad et al. | 709/224 |
| 6,931,434 B1 | * | 8/2005 | Donoho et al. | 709/207 |
| 6,999,990 B1 | * | 2/2006 | Sullivan et al. | 709/205 |
| 7,275,101 B2 | * | 9/2007 | Katayama et al. | 709/224 |
| 7,620,848 B1 | * | 11/2009 | Tanner | 714/25 |
| 2002/0034942 A1 | * | 3/2002 | Khreisat et al. | 455/423 |
| 2002/0165952 A1 | * | 11/2002 | Sewell et al. | 709/224 |

(Continued)

FOREIGN PATENT DOCUMENTS
EP       0903889 A2   3/1999
(Continued)

OTHER PUBLICATIONS
PCT/ISA/210—International Search Report—Jun. 10, 2008.
(Continued)

*Primary Examiner* — Alina N. Boutah
(74) *Attorney, Agent, or Firm* — Venable LLP; Eric J. Franklin

(57) ABSTRACT

A method, a device and computer program products product for allowing performance related data to be obtained from an isolated computer network that includes a diagnostics collection function. Selections from a support user of nodes and plug-in modules associated with applications provided in the isolated computer network that are to be diagnosed are received by a autocollector file generating unit, which then provides at least one command file with instructions for the diagnostics collection function, including the user selected nodes and plug-in modules, and saves the provided data as an autocollector file that automatically makes the diagnostics collection function to apply the command file on the nodes and plug in modules when being activated.

18 Claims, 2 Drawing Sheets

U.S. PATENT DOCUMENTS

| | | | |
|---|---|---|---|
| 2002/0184065 A1* | 12/2002 | Menard et al. | 705/7 |
| 2003/0009710 A1* | 1/2003 | Grant | 714/37 |
| 2003/0097469 A1* | 5/2003 | Blair et al. | 709/239 |
| 2003/0187619 A1* | 10/2003 | Lee et al. | 702/188 |
| 2004/0008825 A1* | 1/2004 | Seeley et al. | 379/32.01 |
| 2004/0236843 A1* | 11/2004 | Wing et al. | 709/219 |
| 2005/0154557 A1* | 7/2005 | Ebert | 702/182 |
| 2006/0031476 A1* | 2/2006 | Mathes et al. | 709/224 |
| 2006/0047974 A1* | 3/2006 | Alpern et al. | 713/191 |
| 2007/0043634 A1* | 2/2007 | Bar et al. | 705/28 |
| 2007/0207800 A1* | 9/2007 | Daley et al. | 455/425 |
| 2007/0233644 A1* | 10/2007 | Bakalash et al. | 707/2 |
| 2008/0005611 A1* | 1/2008 | Solyanik | 714/6 |
| 2008/0040174 A1* | 2/2008 | Murthy et al. | 705/7 |
| 2008/0097947 A1* | 4/2008 | Stich et al. | 706/47 |
| 2008/0127175 A1* | 5/2008 | Naranjo et al. | 717/174 |
| 2010/0088683 A1* | 4/2010 | Golender et al. | 717/128 |
| 2010/0197238 A1* | 8/2010 | Pathuri et al. | 455/67.11 |

FOREIGN PATENT DOCUMENTS

| | | |
|---|---|---|
| GB | 2313457 A | 11/1997 |

OTHER PUBLICATIONS

PCT/ISA/237—Written Opinion of the International Searching Authority—Jun. 10, 2008.

PCT/IPEA/409—International Preliminary Report on Patentability—Apr. 24, 2009.

\* cited by examiner

SIMPLIFIED SUPPORT OF AN ISOLATED COMPUTER NETWORK

CROSS-REFERENCE TO RELATED APPLICATIONS

This application claims priority to European patent application 07108142.6 filed 14 May 2007 and is the national phase under 35 U.S.C. §371 of PCT/EP2008/054113 filed 4 Apr. 2008.

TECHNICAL FIELD OF THE INVENTION

The present invention relates to the provision of support of isolated computer networks. The invention more particularly relates to a method, a device and a computer program product for allowing performance related data to be obtained from an isolated computer network that includes a diagnostics collection function.

DESCRIPTION OF RELATED ART

Computer networks are known to be used for controlling manufacturing and process industries, such as chemical plants, oil refineries, pulp and paper mills, steel mills, etc.

These networks also often include a diagnostics collection function that is arranged to collect diagnostic data that can provide a support user in a support organisation relevant data for discovering faults and errors in the software used in controlling the function.

However, for security reasons these networks are often isolated from other networks, including the environment where the support user is located. This means that there is no direct way in which a support user can access such a diagnostics collection function in order to locate a fault.

The personnel running such a network are furthermore often not well acquainted with such a diagnostics function and are often hesitant in starting this function in case a fault occurs. In order to locate a fault the support user would then have to either contact such personnel by phone or in writing and instruct them how to operate the diagnostics function in order to locate a fault. This is often very hard to do, because the personnel are then often more occupied with the direct problems at hand, such as the implications of the fault on the process being run. The support user may of course also travel in person to the site of the network and there run the diagnostics collection function. However, this is also often not feasible, because the support organisation may be located very far from the isolated network.

There is thus a need for being able to provide relevant data for running a diagnostics collection function, which data can be applied in the isolated network with a minimum of involvement of the personnel of the isolated network.

SUMMARY OF THE INVENTION

The present invention is therefore directed towards providing relevant data for running a diagnostics collection function provided in an isolated computer network, which data can be applied on the diagnostics collection function with a minimum of involvement of the users of the isolated network.

One object of the present invention is therefore to provide a method for allowing performance related data to be obtained from an isolated computer network that includes a diagnostics collection function, which method applies data on the diagnostics collection function with a minimum of involvement of the users of the isolated network.

This object is according to a first aspect of the present invention achieved through a method for allowing performance related data to be obtained from an isolated computer network that includes a diagnostics collection function and comprising the steps of: receiving selections from a support user of nodes and plug-in modules associated with applications provided in the isolated computer network that are to be diagnosed, providing at least one command file with instructions for the diagnostics collection function, including the user selected nodes and plug-in modules, and saving the provided data as an autocollector file that automatically makes the diagnostics collection function to apply the command file on the nodes and plug in modules when being activated.

Another object of the present invention is to provide a device for allowing performance related data to be obtained from an isolated computer network that includes a diagnostics collection function, which device enables the application of data on the diagnostics collection function with a minimum of involvement of the users of the isolated network.

This object is according to a second aspect of the present invention achieved through a device for allowing performance related data to be obtained from an isolated computer network that includes a diagnostics collection function, comprising:
a support user interface for receiving selections from a support user of nodes and plug-in modules associated with applications provided in the isolated computer network that are to be diagnosed, and
an autocollector file generating unit arranged to
provide at least one command file with instructions for the diagnostics collection function, including the user selected nodes and plug-in modules, and
save the provided data as an autocollector file that automatically makes the diagnostics collection function to apply the command file on the nodes and plug in modules when being activated.

Another object of the present invention is to provide a computer program product for allowing performance related data to be obtained from an isolated computer network that includes a diagnostics collection function, which computer program product allows the application of data on the diagnostics collection function with a minimum of involvement of the users of the isolated network.

This object is according to a third aspect of the present invention achieved through a computer program product for allowing performance related data to be obtained from an isolated computer network that includes a diagnostics collection function, comprising computer program code to make a computer when said code is loaded into said computer:
receive selections from a support user of nodes and plug-in modules associated with applications provided in the isolated computer network that are to be diagnosed,
provide at least one command file with instructions for the diagnostics collection function, including the user selected nodes and plug-in modules, and
save the provided data as an autocollector file that automatically makes an diagnostics collection function apply the command file on the nodes and plug in modules when being activated.

Another object of the present invention is to provide a computer program product for allowing performance related data to be obtained from an isolated computer network that includes a diagnostics collection function, which computer program product applies data on the diagnostics collection function with a minimum of involvement of the users of the isolated network.

This object is according to a fourth aspect of the present invention achieved through a computer program product for allowing performance related data to be obtained from an isolated computer network that includes a diagnostics collection function, comprising computer program code to make a computer when said code is loaded into said computer: automatically identify a diagnostics collection function, and supply at least one command file, which is provided in the computer program product and which identifies nodes and plug in modules of the isolated computer network that are to be diagnosed, to the identified diagnostics collection function when being activated The present invention has many advantages. It allows the collection of performance related data that is necessary to have for the support user with a minimum of involvement from a user of the isolated network. He/she just has to activate the autocollector file in the isolated environment and does not have to look through or investigate how the diagnostics collection function operates. It is invoked automatically by the autocollector file. The present invention therefore provides support in a simple way for an isolated network while still ensuring that the necessary data is gathered.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
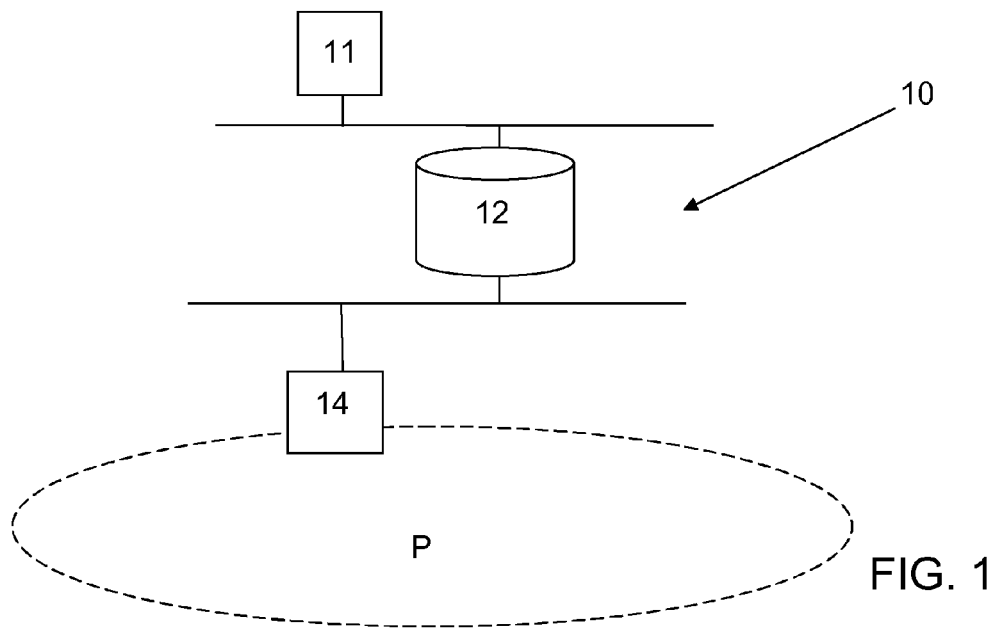
FIG. 1 schematically shows a simplified computer network for process control.

FIG. 1 schematically shows a computer network 10 where an autocollector file is to be used according to the principles of the present invention. The network is typically a network for process control. The network is typically also an object based computerised system for controlling a process or perhaps part of a process. Typical processes are electrical power generation and supply process, water purification and distribution processes, oil and gas production and distribution processes, petrochemical, chemical, pharmaceutical and food processes, and pulp and paper production processes. These are just some examples of processes where the network can be used. There exist countless other processes. The network 10 in FIG. 1 has a low level device 14, which is directly involved in controlling the process P, a control device 12 on a control level as well as an operator terminal 11 on an operator level. It should be realised that the network shown in FIG. 1 is a simplified network in order to describe the environment for which the present invention is to be applied. There can therefore be several low level devices, control devices and operator terminals. However, the network 10 is isolated. Thus it is not connected to the outside world. It is therefore not possible to communicate with the network 10 from outside.

Figure 2:
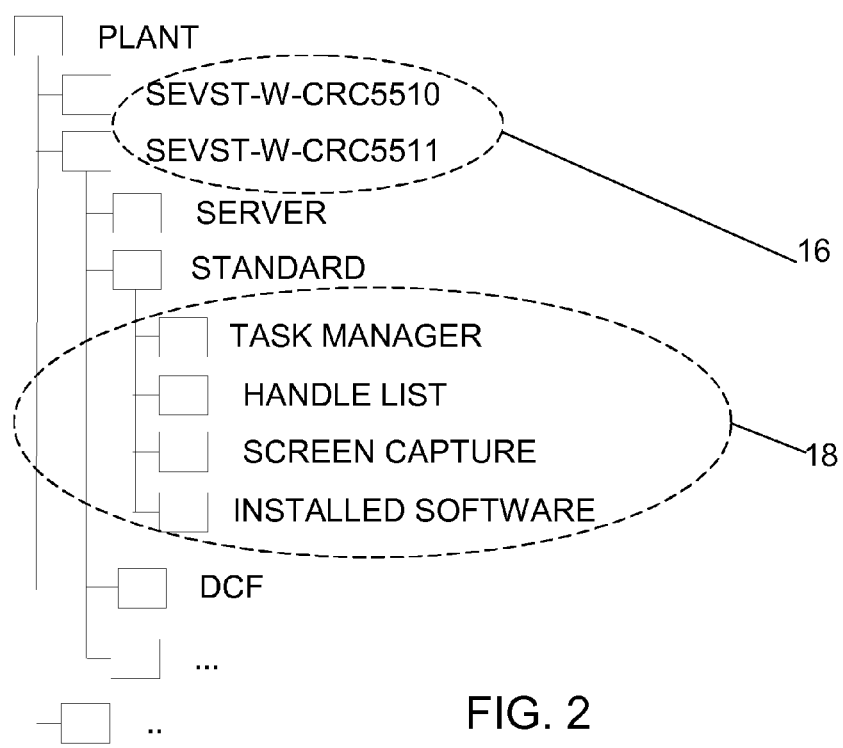
FIG. 2 outlines a structure of nodes and content in one node of the network in FIG. 1.

The network is organized in a hierarchical data structure with nodes and items of these nodes in the form of software and files. FIG. 2 shows a simplified such structure where a first highest level is named Plant. In a second level there are provided two objects named SEVST-W-CRC5510 and SEVST-W-CRC5511, which are both nodes 16 of the structure. A further unnamed node is indicated in the bottom of the structure in order to show that there may be several such nodes. In a lower level of one of the nodes SEVST-W-CRC5511, there are provided a number of folders Server, Standard and DCF. Here the item server includes the various control functionality or control software that is provided in the server 12 of FIG. 1. The folder Standard includes a number of plug-in modules 18, which are here exemplified by the modules task manager, handle list, screen capture and installed software. The plug-in modules are associated with applications provided in the network and include information about how software in the node functions and may then include such information as software versions. There is furthermore a folder DCF on the first server 12, which includes a diagnostics collection function. This functionality may be in the form of DCT (Diagnostics Collection Tool) being sold by the company ABB. This tool runs a number of command files for collecting relevant diagnostic data on the network, which diagnostics data may be provided in one or more diagnostics files that may be in the form of XML files. The collecting is normally done through ordering a plug-in module to collect diagnostics data. A plug-in module may then fetch an already existing file. A plug-in module may also be ordered to collect fresh data and create one or more diagnostics files based on data in the network.

In order to give technical support to the network there is furthermore provided a support organisation. This support organisation knows how to use the diagnostics collection function. However the direct network users that are normally involved in process control do not.

As mentioned above the network is isolated. This is often done for security reasons. This means that there is no direct way in which the support organisation can access the diagnostics collection function DCF in order to locate a fault.

The users of the isolated network are furthermore often not well acquainted with such a diagnostics collection function and are often hesitant in starting this function in case a fault occurs. However, they are very much interested in the problem being located and resolved.

The present invention is provided for solving this situation.

Figure 3:
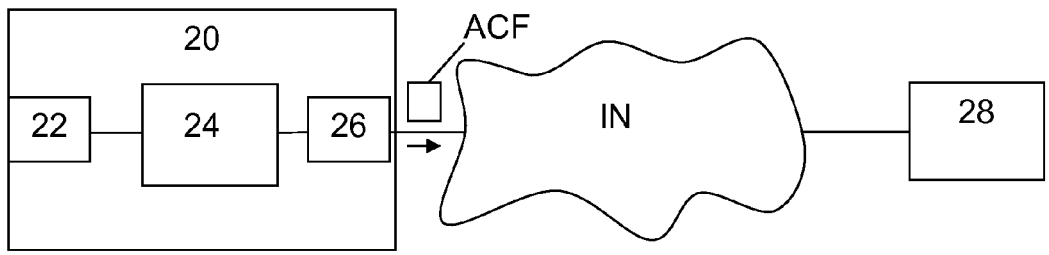
FIG. 3 shows a block schematic of a device for allowing performance related data to be obtained from an isolated computer network, which device communicates with a computer of a user in the isolated network via the Internet.

Reference is therefore now being made to FIG. 3, which shows a block schematic of a device 20 for allowing performance related data to be obtained from the isolated computer network. Here the device 20 communicates with a computer 28 via the Internet IN. The computer 28 is here associated with the company which owns or operates the network shown in FIG. 1 and is associated with at least one of the users of the isolated network. It is thus a receiving entity related to the isolated network. However it is not connected to the computer network of FIG. 1. The device 20 may be provided in the computer network of a support organisation provided for at least parts of the isolated network and being associated with the diagnostics collection function of that network. The device 20 includes a support user interface 22 via which a support user, i.e. support users may communicate with an autocollector file generating unit 24. The autocollector file generating unit 24 is in turn connected to a communication unit 26, here also provided in the device 20, for communicating with the Internet IN. The communication unit 26 is here a standard computer communications unit. According to the present invention the autocollector file generating unit 24 generates an autocollector file ACF, which is transferred to the computer 28 via the internet IN.

It should here be realised that the Internet is a mere example of a wide area network that may be used in relation to the present invention. Any type of network may be used, for instance a wireless network like a wireless telecommunication network.

Figure 4:
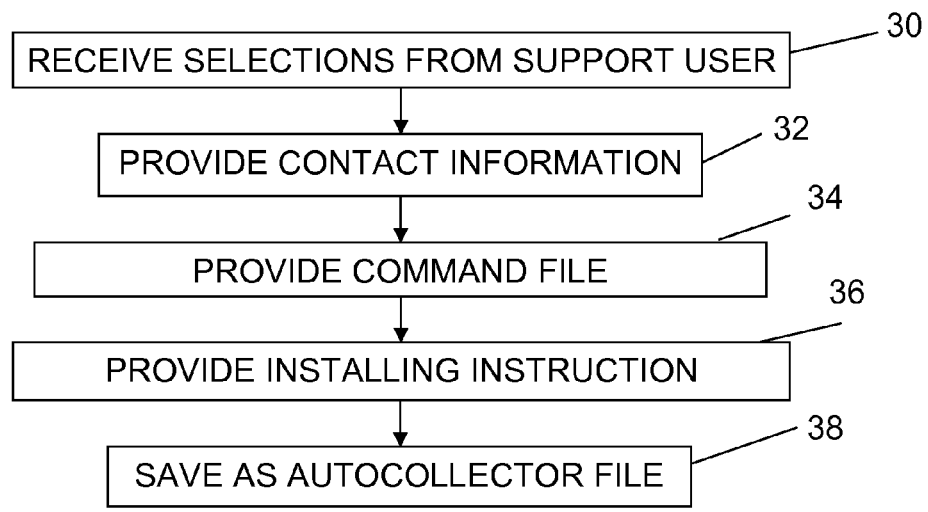
FIG. 4 shows a flow chart outlining a number of method steps taken in a method for allowing performance related data to be obtained from the isolated computer network according to the present invention, FIG. 5, generally outlines an autocollector file according to the principles of the present invention, and FIG. 6 schematically shows a computer program product in the form of a CD ROM disc comprising computer program code for carrying out the method of the present invention.
Figure 5:
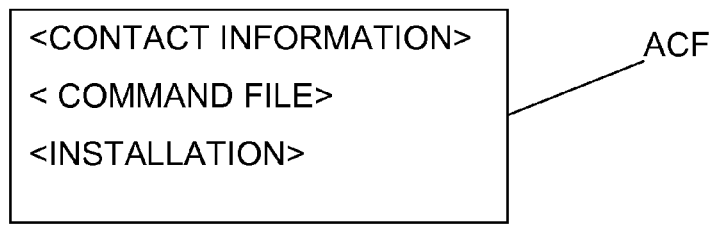

The functioning of the present invention will now be described in more detail with reference being made to the previously described FIG. 1-3 as well as to FIG. 4, which shows a flow chart outlining a number of method steps taken in a method for allowing performance related data to be obtained from an isolated computer network according to the present invention and to FIG. 5, which generally outlines an autocollector file according to the principles of the present invention.

It all starts with a support user associated with the device 20 receiving an indication that there is a fault in the isolated network 10. The user would then like to get in touch with the diagnostics collection function DCF of that network 10 in order to collect diagnostic data that is to be analysed. After such an analysis, the support user will normally be able to provide a solution of the cause of the fault in the network 10. However, there is no way for the support user to directly get in contact with the diagnostics collection function DCF since the network is isolated. The support user therefore starts an autocollector file generating function that is supplied by the autocollector file generating unit 24 in the device 20. This application is started through suitable activation commands entered via the support user interface 22. When the function is started the support user is presented with the possibility to generate an autocollector file ACF.

As the support user then selects to generate an autocollector file, he/she is first asked to enter various selections via the interface 22. These selections include a selection of nodes in the isolated network that are to be investigated as well as plug-in modules of these nodes. This is often not so problematic since the support user is normally aware of the names the plug-in modules that exist. Nodes that can be selected are either all nodes or a limited set of nodes. A support user can select a limited set of nodes through applying knowledge about the node naming structure and select nodes according to the way they are named. A client node may for instance start with the characters "CL" and a server node with the characters "S_". The user may then select for instance nodes having a name starting with "S_". Other selections that may be entered include various points in time when data is to be gathered. This may be necessary if large amounts of data are to be gathered. The data gathering can then be set to be made at a certain time when there is lower activity in the isolated network, like for instance in the middle of the night. It is here also possible to set recurring times when data collection is to be performed. Other selections that may be made include a selection to automatically install the autocollector file on a node of the isolated network when this file is being activated or being run in a computer of the isolated network 10, like the server 12, and a size limitation of result files, i.e. that the collected data shall be provided in a number of files that have a limited size. A file size limitation will enable sending collection data when one or both of the device 20 and computer 28 operate under file size restrictions. Along with these selections the autocollector file generating unit 24 also receives support contact information that may include telephone, number, an e-mail address of the support user as well as a message intended for an intended receiver of the file, which is a user of the isolated network 10. The text message may here include a string including the name of the support user and how he may be contacted, like for instance his phone number as well as some brief information about how the autocollector file is to be used. It may also include return message functionality, for instance in the form of a link to the e-mail address of the support user for automatically generating e-mail message if selected. These selections are thus received from the support user by the autocollector file generating unit 24, step 30. It then generates an autocollector file ACF based on these selections. For this reason the autocollector file generating unit 24 first provides the contact information together with an instruction to present the contact information, i.e. computer program code ordering a computer to present it, step 32. The autocollector file generating unit 24 then provides at least one command file, step 34, which is to be inserted in the autocollector file ACF. This command file is generated based on the support user selections and includes instructions provided for the diagnostics collection function to search through nodes and plug-in units that have been entered by the support user. The command file may thus include a setting of all nodes or a limited number of nodes selected according to the node naming structure. The command file is normally provided as an XML file. It may also include the file size limitations. Thereafter the unit 24 provides the installing instructions, step 36, if these were selected, which are instructions to a computer to install the file if the file is being activated or run. Time data that relate to the points in time previously entered by the support user may be included in the file as instructions to automatically start the autocollector file at different times or at time intervals and to provide the command file or command files to the diagnostics collection function DCF at these times or time intervals. The installing instruction may here include information on which node it is to be installed, which is preferably on the same node where the diagnostics collection function DCF is installed. Thereafter the autocollector generating unit 24 saves these provided data as an autocollector file ACF, step 38. This file ACF is a file of type that the diagnostics collection function DCF automatically recognises as a file it can run. This ability to recognise the file may be provided through using a suitable file extension. Thereafter the file ACF may be sent to the computer 28. The support user may here get to select the destination via the above made selections, whereupon the file is automatically sent from the autocollector file generating unit 24 via the communication unit 26 upon the completion of the file. As an alternative the file ACF may be saved on the device 20 and the support user may then later send it as an attachment in a regular e-mail. However it is also possible to save it on a portable data carrier such as a CD ROM disc and send this carrier to the receiving entity, either via regular mail or via courier.

It should here be realised that the autocollector file could also include settings indicating a location where the data files being collected are provided in order to enable speedier return of these files to the support user.

As the user of the isolated network 10 receives the autocollector file via the computer 28, he/she may then bring it to the isolated network 10, for instance using a CD Rom disc, diskette, memory stick or any other suitable type of moveable memory. When he/she then activates or selects the file in that environment, which is normally done through double-clicking on the file ACF so that it is being run, he/she is first presented with the contact information and then, if he/she accepts data collection to be made (via further clicking), the operating system used in the isolated network 10 directly knows that the diagnostics collection function DCF is the function that is to run the file, by studying the file extension. If the file includes an installation instruction it is installed, whereupon the diagnostics collection function gets activated at the time or times indicated. Otherwise the diagnostics collection function may be activated directly. When the diagnostics collection function DCF is activated it is the supplied with the one or more command files and then collects performance related data from the indicated nodes and the plug-in modules indicated in the command files in a known way. It also provides result files or collection files possibly according to the size indicated and at the specified location. The user of the isolated network may then collect the collection file or files on a movable memory and send them back to the support user in the same way as the autocollector file ACF was received.

In this way it is possible to collect performance related data that is necessary for the support user with a minimum of involvement from the isolated network user. He/she just has to activate the autocollector file in the isolated environment and does not have to look through or investigate how the diagnostics collection function operates. It is invoked automatically, through clicking on the autocollector file. The present invention therefore provides support in a simple way for an isolated network while still ensuring that the necessary data is gathered.

Figure 6:
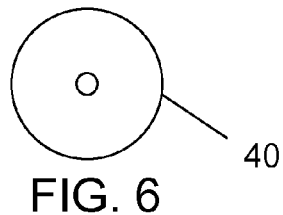

The device for allowing performance related data to be obtained from an isolated computer network according to the present invention, may be implemented through one or more processors together with computer program code for performing its functions. The program code mentioned above may also be provided as a computer program product, for instance in the form of one or more data carriers carrying computer program code for performing the functionality of the present invention when being loaded into the computer. One such carrier 40, in the form of a CD ROM disc is generally outlined in FIG. 6. It is however feasible with other data carriers, like diskettes, memory sticks or USB memories. The computer program code can furthermore be provided as pure program code on an external server and fetched from there for provision in the device that is to receive it. Also the autocollector file may be transferred in this way.

While the invention has been described in connection with what is presently considered to be most practical and preferred embodiments, it is to be understood that the invention is not to be limited to the disclosed embodiments, but on the contrary, is intended to cover various modifications and equivalent arrangements. The invention is for example not limited to computer networks involved in process control, but can be applied in any isolated computer network. Therefore the present invention is only to be limited by the following claims.

The invention claimed is:

1. A method for allowing performance related data to be obtained from an isolated computer network, that is not connected to other networks, and that includes a diagnostics collection function, the method comprising:
   receiving from a support user selections of nodes and plug-in modules associated with applications provided in the isolated computer network that are to be diagnosed;
   providing at least one command data file with instructions for the diagnostics collection function, including the support user selected nodes and plug-in modules;
   saving the provided data file as an autocollector file that automatically makes the diagnostics collection function to apply the command file on the nodes and plug in modules when being activated in the isolated computer network; and
   loading by an isolated network user the autocollector file into the isolated computer network and activating the autocollector file in the isolated computer network, thereby obtaining the performance related data from the isolated computer network.

2. The method according to claim 1, further comprising:
   sending said autocollector file to a receiving entity associated with to the isolated computer network.

3. The method according to claim 1, wherein the receiving selections comprises receiving selections about at least one point in time when data is to be collected, the method further comprising:
   providing the data corresponding to the time selections in the autocollector file.

4. The method according to claim 1, wherein the receiving selections comprises receiving a selection to install the autocollector file on a node in the isolated computer network, the method further comprising:
   providing in the autocollector file an instruction to install the autocollector file on a node when being activated.

5. The method according to claim 1, further comprising:
   providing an instruction to present at least the location of result files from the diagnostics collection function for a user of the isolated computer network receiving the file so that these result files may be sent to the support user.

6. The method according to claim 1, wherein the receiving selections comprises receiving selections about a limited collection data file size and providing a limited collection data file size setting in the autocollector file in order to make the diagnostics collection function provide result files of said limited sizes.

7. The method according to claim 1, wherein the receiving selections comprises receiving support user contact information and providing said support user contact information in the autocollector file.

8. The method according to claim 7, further comprising:
   providing return message functionality in the autocollector file, which functionality may be any of a name, a link, an address.

9. A device for allowing performance related data to be obtained from an isolated computer network that is not connected to other networks and that includes a diagnostics collection function, the device comprising:
   a support user interface for a support user to enter selections of nodes and plug-in modules associated with applications provided in the isolated computer network that are to be diagnosed; and
   an autocollector file generating unit comprising a processor and arranged to provide at least one command data file with instructions for the diagnostics collection function, including the user selected nodes and plug-in modules, and to save the provided data file as an autocollector file that automatically makes the diagnostics collection function to apply the command file on the nodes and plug in modules when being activated in the isolated computer network by an isolated computer network user.

10. The device according to claim 9, further comprising:
a communication unit, wherein the autocollector file generating unit is further arranged to order the communication unit to send said autocollector file to a receiving entity related to the isolated computer network.

11. The device according to claim 9, wherein the selections comprise selections about at least one point in time when data is to be collected and the autocollector file generating unit is further arranged to provide time data corresponding to the time selections in the autocollector file.

12. The device according to claim 9, wherein the selections comprise a selection to install the auto-collector file on a node in the isolated computer network and the autocollector file generating unit is further arranged to provide, in the autocollector file, an instruction to install said autocollector file on a node when being activated.

13. The device according to claim 9, wherein the autocollector file generating unit is further arranged to provide an instruction to present at least the location of result files from the diagnostics collection function for a user of the isolated computer network receiving the file so that these result files may be sent to the support user.

14. The device according to claim 9, wherein the selections comprise selections about a limited collection data file size, and wherein the autocollector file generating unit is further arranged to provide a limited collection data file size setting in the autocollector file in order to make the diagnostics collection function provide result files of said limited sizes.

15. The device according to claim 9, wherein said autocollector file generating unit is further arranged to receive support user contact information via said user interface and to provide said support user contact information in the autocollector file.

16. The device according to claim 15, wherein said autocollector file generating unit is further arranged to provide return message functionality in the autocollector file.

17. A computer program product for allowing performance related data to be obtained from an isolated computer network that is not connected to other networks and that includes a diagnostics collection function, the computer program product comprising:
a non-transitory computer readable medium; and
computer program code recorded on the computer readable medium and to make a computer when said code is loaded into said computer carry out a method comprising:
receiving from a support user selections of nodes and plug-in modules associated with applications provided in the isolated computer network that are to be diagnosed;
providing at least one command data file with instructions for the diagnostics collection function, including the support user selected nodes and plug-in modules;
saving the provided data file as an autocollector file that automatically makes the diagnostics collection function to apply the command file on the nodes and plug in modules when being activated in the isolated computer network; and
loading by an isolated network user the autocollector file into the isolated computer network and activating the autocollector file in the isolated computer network, thereby obtaining the performance related data from the isolated computer network.

18. A computer program product for allowing performance related data to be obtained from an isolated computer network that is not connected to other networks and that includes a diagnostics collection function, the computer program product comprising:
a non-transitory computer readable medium; and
computer program code recorded on the computer readable medium to make a computer when said code is loaded into said computer carry out a method comprising:
automatically identifying a diagnostics collection function, and
supplying at least one command file, which is provided in the computer program product and which identifies nodes and plug in modules of the isolated computer network that are to be diagnosed, to the identified diagnostics collection function when being activated in the isolated computer network by an isolated computer network user.

* * * * *

UNITED STATES PATENT AND TRADEMARK OFFICE
CERTIFICATE OF CORRECTION

PATENT NO. : 8,307,069 B2  
APPLICATION NO. : 12/600342  
DATED : November 6, 2012  
INVENTOR(S) : Isak Savo et al.

Page 1 of 1

It is certified that error appears in the above-identified patent and that said Letters Patent is hereby corrected as shown below:

On the title page item (75) Inventors: Second inventor should read as:

Martin Olausson, Västerås (~~SA~~ SE)

item (30) Foreign Application Priority Data should read as:

May 14, 2007   (EP) ................................07108142.6

Signed and Sealed this
Twentieth Day of May, 2014

Michelle K. Lee
*Deputy Director of the United States Patent and Trademark Office*